(12) United States Patent
Murty et al.

(10) Patent No.: US 7,730,246 B2
(45) Date of Patent: Jun. 1, 2010

(54) OPPORTUNISTIC TRANSMISSION OF SOFTWARE STATE INFORMATION WITHIN A LINK BASED COMPUTING SYSTEM

(75) Inventors: Keshavram N. Murty, Phoenix, AZ (US); Tessil Thomas, Bangalore (IN); Keshavan Tiruvallur, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 1004 days.

(21) Appl. No.: 11/173,995

(22) Filed: Jun. 30, 2005

(65) Prior Publication Data

US 2007/0005943 A1 Jan. 4, 2007

(51) Int. Cl.
G06F 13/14 (2006.01)
(52) U.S. Cl. ........................ 710/242; 710/107; 710/306; 710/308
(58) Field of Classification Search ......... 710/107–110, 710/112, 240–242, 306–315; 717/130, 138, 717/158, 4, 125–129
See application file for complete search history.

(56) References Cited

U.S. PATENT DOCUMENTS

| | | | | |
|---|---|---|---|---|
| 5,669,002 A | * | 9/1997 | Buch | 710/200 |
| 6,003,143 A | * | 12/1999 | Kim et al. | 714/38 |
| 6,009,488 A | | 12/1999 | Kavipurapu | |
| 6,397,382 B1 | * | 5/2002 | Dawson | 717/130 |
| 6,477,683 B1 | * | 11/2002 | Killian et al. | 716/1 |
| 7,003,698 B2 | | 2/2006 | Glass | |
| 7,065,481 B2 | | 6/2006 | Schubert et al. | |
| 7,401,322 B1 | * | 7/2008 | Shagam et al. | 717/128 |
| 2006/0155843 A1 | | 7/2006 | Glass | |
| 2006/0156065 A1 | | 7/2006 | Glass | |
| 2006/0294427 A1 | | 12/2006 | Glass | |

OTHER PUBLICATIONS

Keshavram N. Murty, et al., "Opportunistic Transmission of Computing System State Information Within a link Based Computing System", U.S. Appl. No. 11/174,101, filed on Jun. 30, 2004. Copy of the claims as presented in the application prior to the mailing of a first office action.

* cited by examiner

*Primary Examiner*—Raymond N Phan
(74) *Attorney, Agent, or Firm*—Blakely, Sokoloff, Taylor & Zafman LLP

(57) ABSTRACT

A method is described that involves determining that software state information of program code is to be made visible to a monitoring system. The method also involves initiating the writing of the software state information into a register. The method also involves waiting for the software state information to be placed onto a link within a link based computing system.

10 Claims, 7 Drawing Sheets

US 7,730,246 B2

OPPORTUNISTIC TRANSMISSION OF SOFTWARE STATE INFORMATION WITHIN A LINK BASED COMPUTING SYSTEM

FIELD OF INVENTION

The field of invention relates generally to the monitoring of computing systems, and, more specifically, to the opportunistic transmission of software state information within a link based computing system.

BACKGROUND

FIG. 1a shows a depiction of a bus 120. A bus 120 is a "shared medium" communication structure that is used to transport communications between electronic components 101a-10Na and 110a. Shared medium means that the components 101a-10Na and 110a that communicate with one another physically share and are connected to the same electronic wiring 120. Thus, for example, if component 101a wished to communicate to component 10Na, component 101a would send information along wiring 120 to component 10Na; if component 103a wished to communicate to component 110a, component 103a would send information along the same wiring 120 to component 110a, etc.

Computing systems have traditionally made use of busses. With respect to certain IBM compatible PCs, bus 120 may correspond to a PCI bus where components 101a-10Na correspond to "I/O" components (e.g., LAN networking adapter cards, MODEMs, hard disk storage devices, etc.) and component 110a corresponds to an I/O Control Hub (ICH). As another example, with respect to certain multiprocessor computing systems, bus 120 may correspond to a "front side" bus where components 101a-10Na correspond to microprocessors and component 110a corresponds to a memory controller.

In the past, when computing system clock speeds were relatively slow, the capacitive loading on the computing system's busses was not a serious issue because the degraded maximum speed of the bus wiring (owing to capacitive loading) still far exceeded the computing system's internal clock speeds. The same cannot be said for at least some of today's computing systems. With the continual increase in computing system clock speeds over the years, the speed of today's computing systems are reaching (and/or perhaps exceeding) the maximum speed of wires that are heavily loaded with capacitance such as bus wiring 120.

Therefore computing systems are migrating to a "link-based" component-to-component interconnection scheme. FIG. 1b shows a comparative example vis-à-vis FIG. 1a. According to the approach of FIG. 1b, computing system components 101a-10Na and 110a are interconnected through a mesh 140 of high speed bidirectional point-to-point links $130_1$ through $130_N$. A bidirectional point-to-point link typically comprises a first unidirectional point-to-point link that transmits information in a first direction and a second unidirectional point-to-point link that transmits information is a second direction that is opposite that of the first direction.

Each point-to-point link can be constructed with copper or fiber optic cabling and appropriate drivers and receivers (e.g., single or differential line drivers and receivers for copper based cables; and LASER or LED E/O transmitters and O/E receivers for fiber optic cables;, etc.). The mesh 140 observed in FIG. 1b is simplistic in that each component is connected by a bidirectional point-to-point link to every other component. In more complicated schemes, the mesh 140 is a network having routing/switching nodes. Here, every component need not be coupled by a point-to-point link to every other component.

Instead, hops across a plurality of links may take place through routing/switching nodes in order to transport information from a source component to a destination component. Depending on implementation, the routing/switching function may be a stand alone function within the mesh network or may be integrated into a substantive component of the computing system (e.g., processor, memory controller, I/O unit, etc.). According to one perspective, the term "link agent" is used to refer to a component of a link based computing system that includes any such substantive component.

FIGURES

The present invention is illustrated by way of example and not limitation in the figures of the accompanying drawings, in which like references indicate similar elements and in which.

DETAILED DESCRIPTION

Figure 1A:
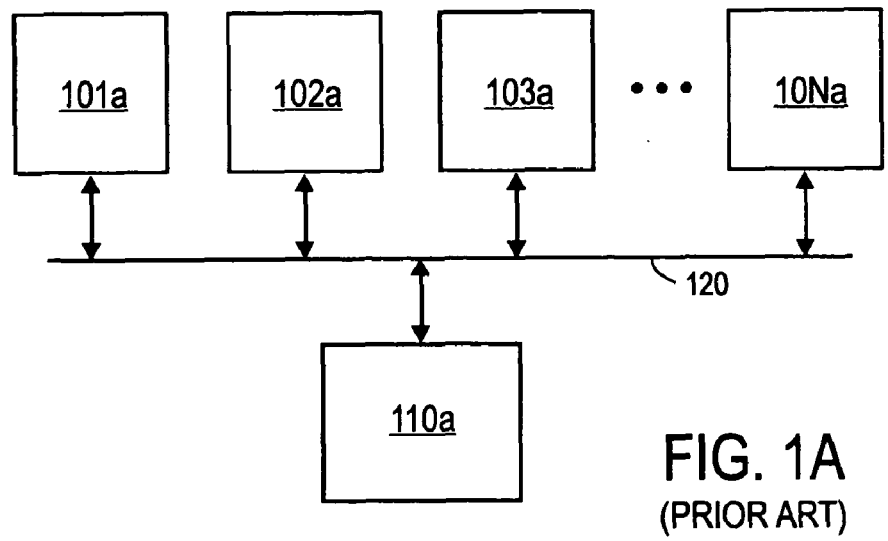
FIG. 1a (prior art) shows a bus between computing system components.
Figure 1B:
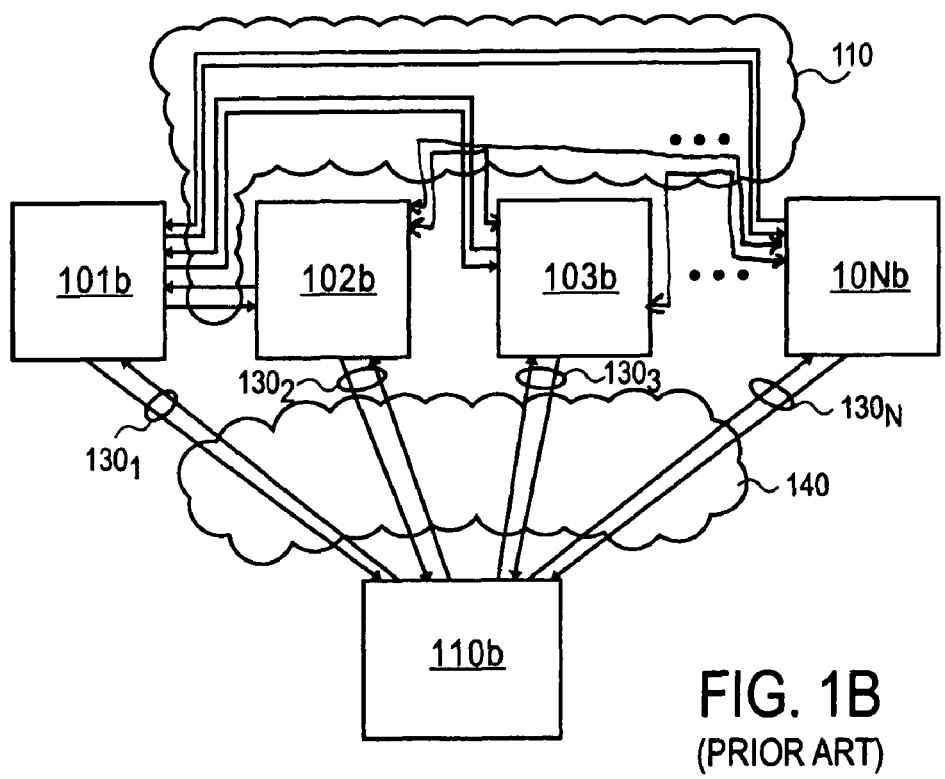
FIG. 1b (prior art) shows bidirectional links between computing system components.
Figure 2:
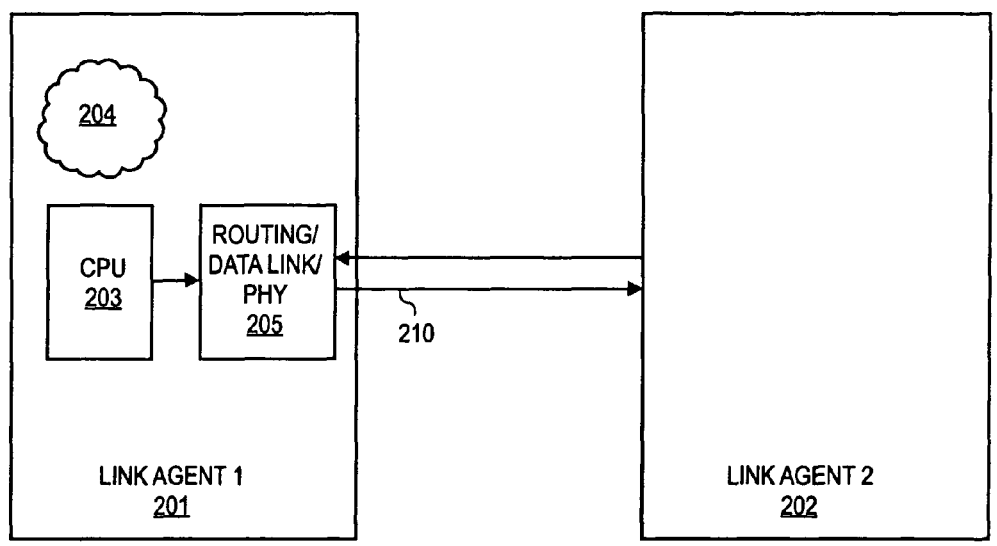
FIG. 2 (prior art) shows a link agent having a processor.

FIG. 2 shows a basic architectural perspective of a link agent 201 whose substantive component(s) at least include a processor 203 (informally referred to in the art as a "CPU"). According to the basic architectural perspective of FIG. 2, the processor 203 interfaces to an architectural layer 205 that essentially performs the "networking" tasks for the link agent. These tasks generally include routing/switching layer tasks (e.g., identification of which node an outgoing packet is to be directed to), data-link layer tasks (e.g., assurance that corrupted information is not accepted from a link) and physical layer tasks (e.g., implementation of an encoding scheme to reduce the susceptibility of transported information to corruption). For simplicity, architectural layer 205 will be referred to more simplistically as the RDP layer 205 (for routing/switching, data-link and physical layers). In an implementation, the RDP layer 205 is made primarily of logic circuitry.

A processor 203 is essentially logic circuitry that executes software code (or "program code"). When, through the execution of the software code, a situation arises in which a packet needs to be sent from the processor 203 to some other link agent, the RDP layer prepares the packet and sends it over the appropriate link (such as link 210). The debugging and/or monitoring of software running on a computing system is enhanced if the "state" of the software code that is running on the processor 203 is somehow made visible to a debugging and/or monitoring system (such as a logic analyzer).

The execution and/or deployment of software code typically involves the assignment of specific values to certain variables. Software state information is basically viewed as any of these specific values as they exist at a specific moment during the software code's execution. By tracking these values at different instances over the software code's "runtime", the operation of the software code itself can be "traced". The question therefore arises as to how to handle the problem of exposing software state information within a link based computing system.

Figure 3:
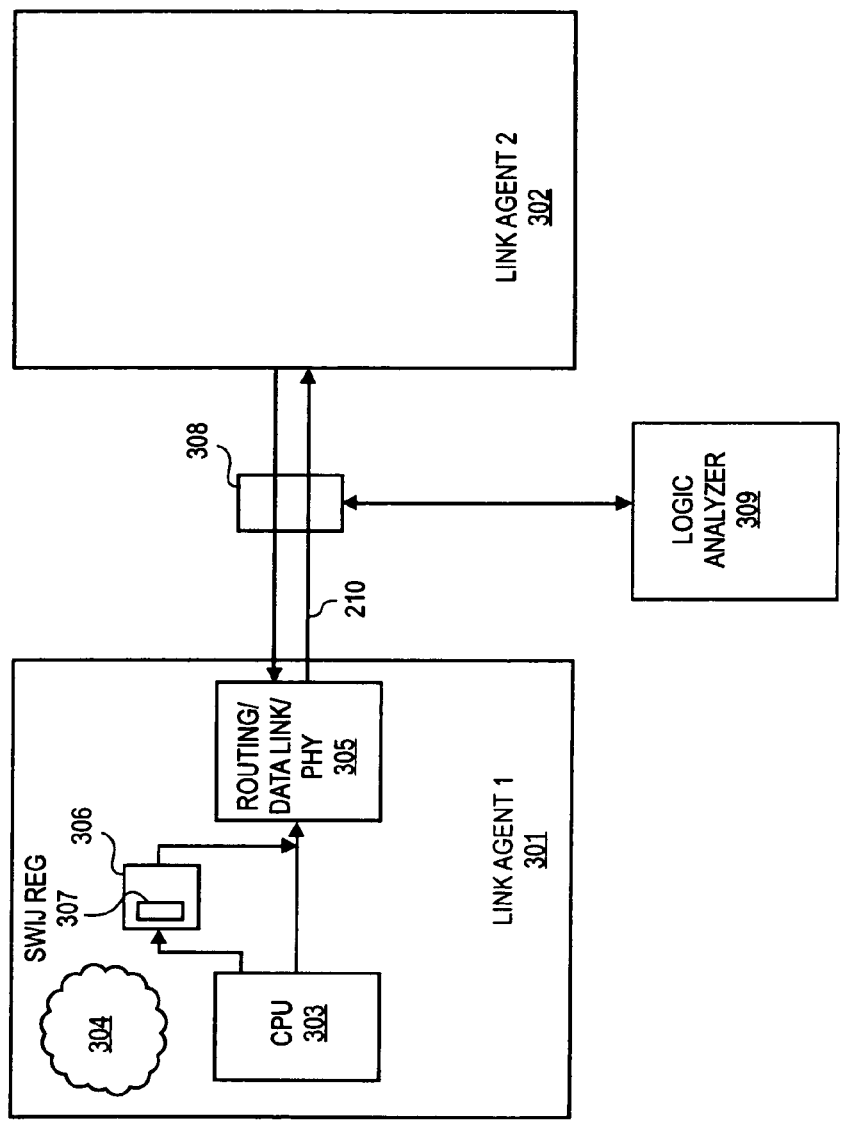
FIG. 3 shows a link agent having a processor whose software code can externally expose its state information.

FIG. 3 presents an architecture suitable for exposing software state information to software debugging and/or monitoring equipment within a link based computing system. According to the architecture of FIG. 3, a "software state injection" (SSIJ) register 307 is used to store software state information that software code 304 running the processor 303 deems worthy of exposing externally to a debugging and/or monitoring system (such as logic analyzer 309). Here, according to a basic implementation, the software code 304 is written so that it writes its state information (or at least a portion of its state information) at an appropriate moment (e.g., at a specific instant of time, at entry and/or exit of a specific branch or function call within the code's flow, etc.) into the SSIJ register 307.

After the software code 304 causes its state information to be written into the SSIJ register 307, logic circuitry 306 associated with the SSIJ register 307 and the RDP layer 305 is responsible for "opportunistically" transmitting an appropriate number of packets that contain the state information into the computing system's network. The state information is then "snooped" off the network and analyzed. The snooping of the state information off the network is shown simplistically in FIG. 3 so as to merely involve the RDP layer's 307 sending of the packetized state information over link 310 and the logic analyzer's 309 detection of the packetized state information on link 310.

Here, "opportunistically" can be interpreted to mean "when the appropriate link is idle". The appropriate link is the link (or links) upon which packets containing software state information to be snooped are placed on. In the simplistic example of FIG. 3, the appropriate link is link 310. By refusing to send packets containing the SSIJ register's contents unless link 310 is idle, the injection of software state information into the computing system's network should prevent the network from being "bogged down" or "perturbed" with debugging/monitoring information that may change traffic flow or event sequences within the system's processor(s). As such, the performance of the computing system as whole should not be adversely affected even though its network is not only transporting the computing system's own working traffic, but also, additional information used to trace the operation of its software.

In an implementation, the logic analyzer 309 and probe 308 used to snoop the packets containing software state information off of link 310 are as described in co-pending U.S. patent application Ser. No. 11/026,907, filed Dec. 30, 2004, entitled "Correlation Technique For Determining Relative Times Of Arrival/Departure Of Core Input/Output Packets Within A Multiple Link-Based Computing System" by Richard J. Glass; and U.S. patent application Ser. No. 11/027,116, Filed Dec. 30, 2004, entitled "Information Transportation Scheme From High Functionality Probe To Logic Analyzer" by Richard J. Glass and Muraleedhara Navada.

Figure 4:
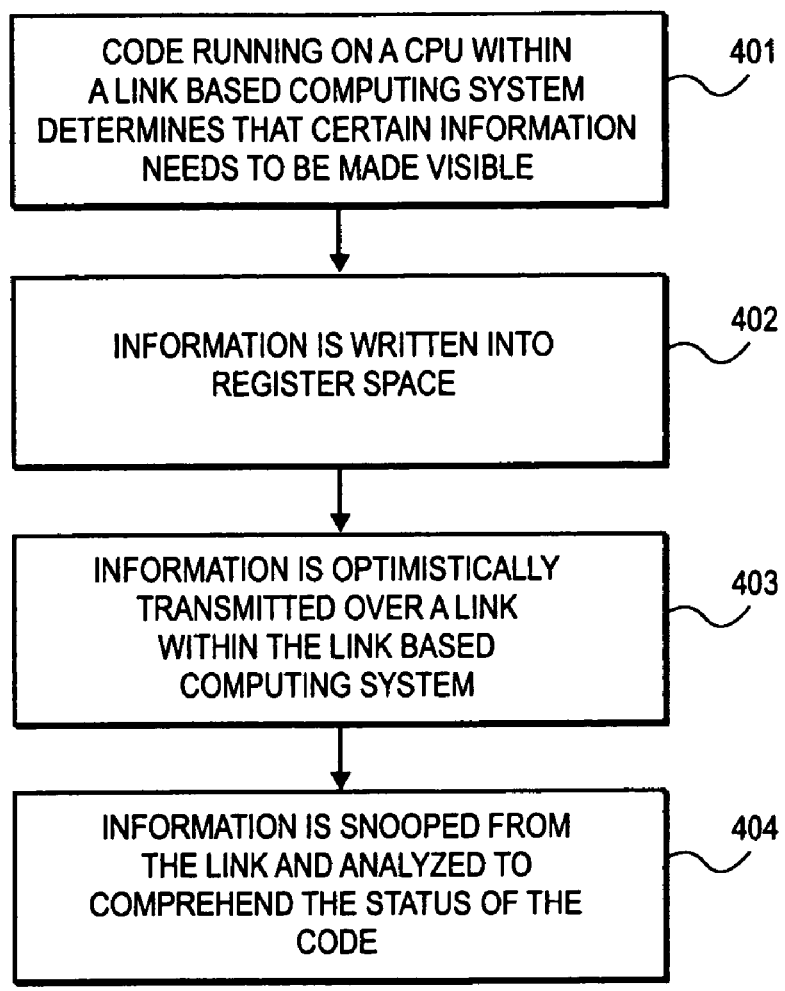
FIG. 4 shows a method for exposing software state information within a link based computing system.

FIG. 4 shows a method for collecting software state information within a link based computing system as described just above. According to the embodiment of FIG. 4, software code running on a processor within a link based computing system determines that certain software state information needs to be made visible 401. This determination results in the appropriate software state information being written into register 402. When a link that the software state information is to be placed on becomes idle, one or more packets containing the software state information are placed onto the link 403. In an implementation, a separate determination of link idleness is made prior to each packet's placement of the link. The information is then snooped from the computing system's network and analyzed to comprehend the state information from the running program code.

Figure 5:
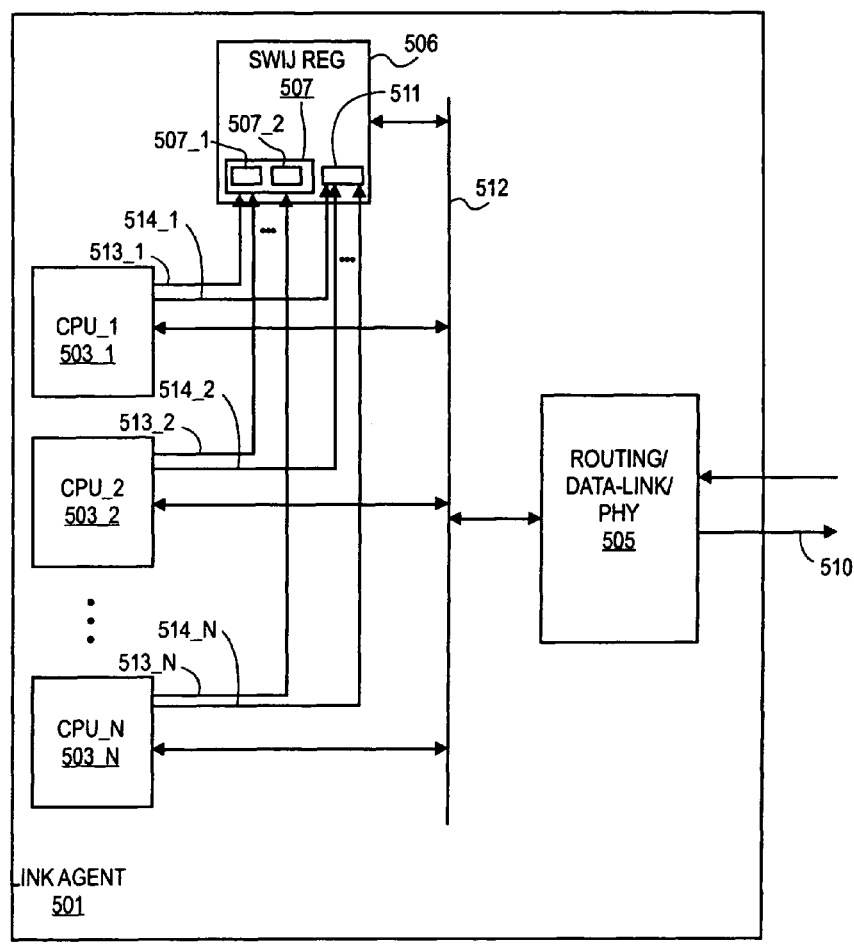
FIG. 5 shows a detailed embodiment of a link agent having a processor whose software code can externally expose its state information.

FIG. 5 shows a more detailed depiction of a link agent 501 that presents software state information consistently with the methodology described above. One of the features of link agent 501 is that it contains multiple processors (i.e., N processors 503_1 through 503_N), and, the SSIJ register 507 is designed to be "shared" amongst the N processors 503_1 through 503_N. Because the link agent 501 contains N processors, as many as N software code sequences may be simultaneously running on the N processors at any given time. Conceivably, more than one of these code sequences may desire to write software state information into the SSIJ space 507 at the same time. Thus, as described in more detail below with respect to FIG. 6; a processor gains "ownership" of the SSIJ register 507 before it can actually write software state information into the register 507.

Another feature of the architecture of FIG. 5 is that as many as two packets worth of software state information may be loaded into SSIJ register at any time. In a further implementation, the computing system as a whole comprehends different types of packets. Specifically, in order to implement a credit based flow control scheme, packets are broken down into smaller packets (called "flits" or "cells") that are actually transmitted over the network. Moreover, a single "software state injection" (SSIJ) packet is deemed to consist of two flits, and, accordingly, SSIJ register 507 contains two separate register regions 507_1, 507_2. Here, a first register region 507_1 is to store the content for a first flit and a second register region 507_2 to store content for a second flit, where, together, the pair of flits correspond to a single SSIJ packet.

The RDP layer 505, through "flit" bus 507, services each of the N processors and the logic circuitry associated with the SSIJ register 507. Here, if a processor needs to send a packet into the network, the processor will pass the flit payloads for the packet over bus 512 to RDP layer 505. The RDP layer then places the flits into the network (e.g., by placing them on link 510). Note that the RDP layer 505 may be coupled to multiple links.

Because each of the N processors write to the SSIJ register 507 in order to expose its corresponding program code's state information, each of processors 503_1 through 503_N are shown being individually coupled to both the SSIJ register 507 as well as an additional register 511 that it used (as explained in more detail below with respect to FIG. 6) to implement a sharing scheme amongst the N processors. Simplistically, if the SSIJ register 507 contains information not yet passed to the RDP layer 505, and if a link idle status is detected on the appropriate link 510, the logic circuitry 506 associated with the SSIJ register 507 passes the contents of registers 507_1, 507_2 as the payloads for a pair of flits over flit bus 512 to the RDP layer 505.

Figure 6:
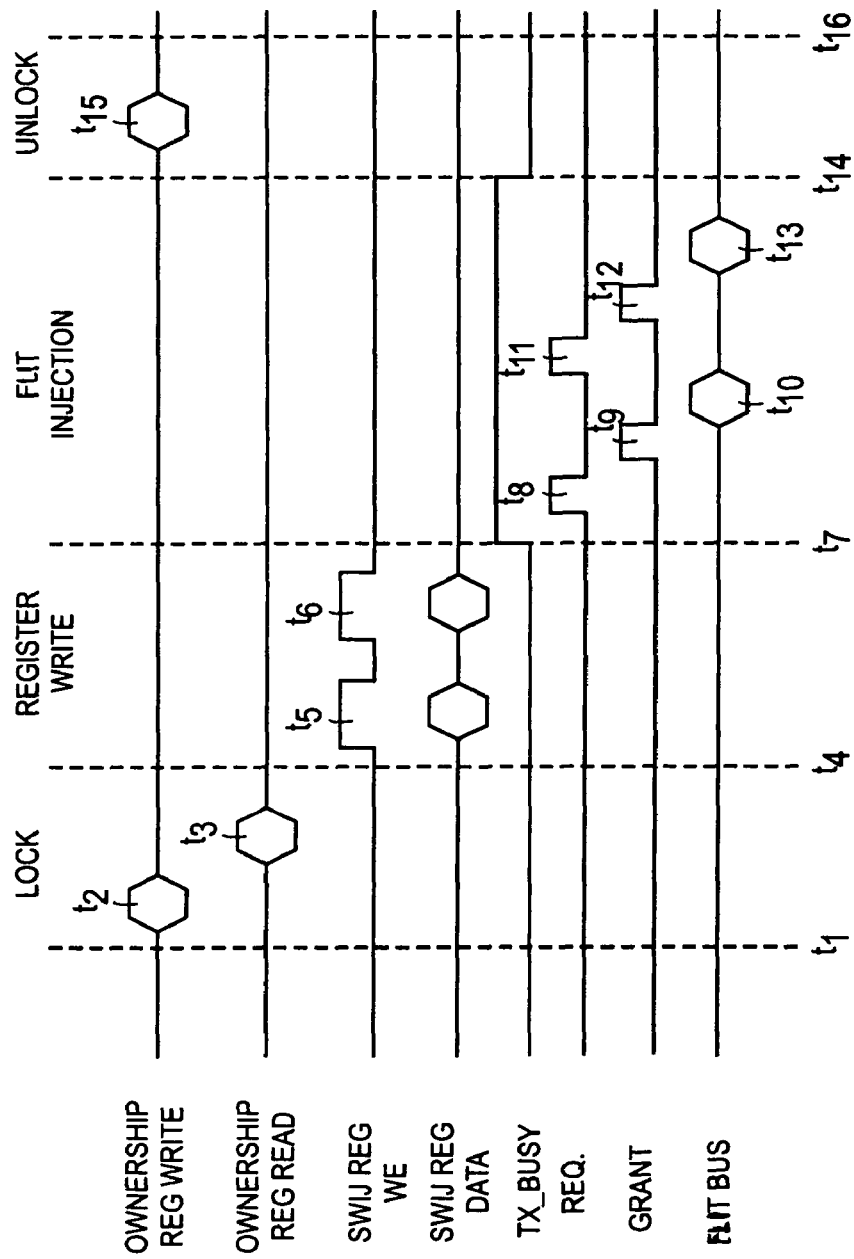
FIG. 6 shows a timing diagram for the circuitry depicted in FIG. 5.
Figure 7:
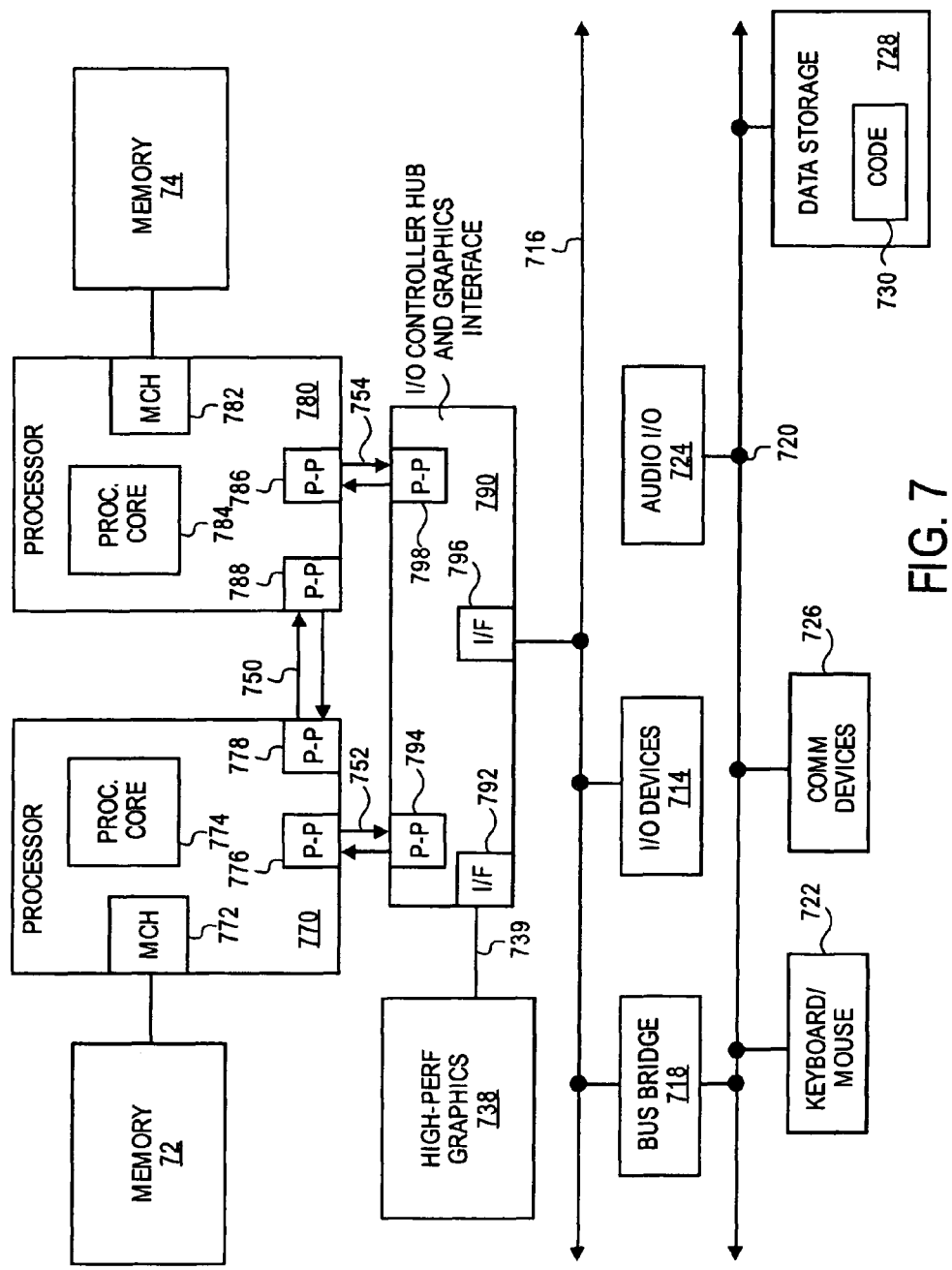
FIG. 7 shows an embodiment of a computing system architecture.

FIG. 6 shows a timing diagram for an embodiment of the circuitry of FIG. 5. According to the timing diagram of FIG. 6, four phases are used to transfer software state information from a processor to an emitted flit having the software state information: 1) a lock phase (between times t1 and t4) in which the processor gains ownership of the shared SSIJ register; 2) a register write phase (between times t4 and t7) in which the processor writes the software state information into the SSIJ register; 3) a flit injection phase (between times t7 and t14) in which flits containing the software state information are placed onto the appropriate outgoing link; 4) an unlock phase (between times t14 and t16) in which the processor relinquishes control of the SSIJ register.

According to the timing diagram of FIG. 6, within the lock phase, the processor attempts to gain control of the SSIJ register by writing to register 511 of FIG. 5. In an implementation, register 511 essentially stores a "one-hot" encoded data structure that indicates which processor of the N processors has ownership of the SSIJ register 507 (e.g., if N=4, a four bit structure is held in register 511 where 0001=processor 503_1 has ownership, 0010=processor 503_2 has ownership, 0100=processor 503_3 has ownership, 1000=processor 503_4 has ownership). If a string of 0s, also referred to as a "null vector", is stored in register 511, then, no processor has ownership of the SSIJ register (e.g., again if N=4,0000=no processor has control of the register 507).

The logic circuitry 506 associated with register 507 is designed to ignore any write attempts into register 511 if the value in register 511 is anything other than a null vector (i.e., ignore an attempt at ownership by a processor if another processor is already recognized as having ownership). As such, the lock phase involves a processor: 1) as shown at time t2, attempting to write a one-hot vector into register 511 whose value corresponds to its ownership of the SSIJ register (e.g., processor 503_1 will attempt to write a value of 0001 in an N=4 link agent); and, 2) as shown at time t3, reading back the value from register 511 after the write attempt at time t2. Here, if register 511 held a null vector immediately prior to the write attempt, the read will reveal the value the processor just attempted to write (i.e., because no other processor was recognized as having ownership, the processor's write attempt was not ignored). If another processor has ownership, the processor will read a different value than the value it just attempted write which signifies that the ownership attempt was not successful.

Assuming the processor is able to confirm its ownership of the SSIJ register, the register write phase will next be executed. Here, the payload for a first flit is written into a first SSIJ register 507_1 at time t5 and the payload for a second flit is written into a second SSIJ register 507_2. In an embodiment, the processor is designed such that one of these payloads will include some control information other than pure software state information (e.g., the identity of the processor that is writing the software state information, information that identifies the flits as belonging to an SSIJ packet, the identity of the link agent 501). The data content that is provided by the software for storage into registers 507_1 and/or 507_2 may be entirely software state information, or, may include some additional control information (e.g., the identity of the piece of software code that is providing the software state information, the time or event that caused the software state information to be recorded into register 507, a sequence number so that consecutive SSIJ packets from the same piece of code can be properly ordered at the debugging/monitoring device).

Once the logic 506 associated with the SSIJ register 507 recognizes freshly declared ownership in the lock phase and freshly written content into the SSIJ register, it sends a request to the RDP layer 505. According to one implementation the RDP layer 505 broadcasts any idleness to logic 506 and the logic 506 submits a request in response (e.g., at time t8). In an alternative implementation, logic 506 sends the request at time t8 in direct response to the flit payloads having been written into register 507, and, the RDP layer 505 is designed to issue a grant to logic 506 (in response to the request from logic 506) only if the RDP layer 505 recognizes that the appropriate link 510 is idle.

Either way, after the first request by logic 506 at time t8 is granted by RDP layer 505 at time t9, the flit payload of one of the registers (e.g., register 507_1) is transferred, at time t10, to the RDP layer 505 over flit bus 512. Then, the process is repeated for the second flit payload where a request is sent at time t11, a grant is sent at time t12, and the second flit payload is transferred to the RDP layer at time t13. The RDP layer 505 then prepares flits from the flit payloads it has received and injects them onto the appropriate link.

Note that over the course of the flit injection phase, a TX_BUSY signal is active. In an implementation, the logic 506 associated with the SSIJ register 507 provides the TX_BUSY signal to the processor whose software state information the flits are being injected on behalf of. Once logic 506 receives notice from the RDP layer 505 that all flits have been successfully sent into the network, logic 506 drops the active state of the TX_BUSY signal (at time t14). When the deactivation of the TX_BUSY signal is observed by the processor, the processor writes a null vector into register 511 to declare its ownership of the SSIJ register 507 is henceforth relinquished.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behaviorial level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

It is also to be understood that embodiments of this invention may be used as or to support a software program executed upon some form of processing core (such as a Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:
1. A method comprising:
within a link based computing system:
determining with software code that software state information of said software code is to be made visible to a monitoring system that is coupled to a first link within said link based computing system said software code executing on a processor within a node of said computing system, said node having more than one processor; and, said processor obtaining ownership of a register;

said processor writing said software state information into said register;

transferring said software state information from said register to logic circuitry responsible for preparing rackets that are placed on a second link within said computing system;

opportunistically transmitting said software state information on said second link within said link based computing system, said second link stemming from said node.

2. The method of claim 1 wherein said first link and said second link are the same link.

3. The method of claim 1 wherein said monitoring system is a debugging system.

4. The method of claim 1 wherein more than one processor of said node is implemented on a semiconductor chip.

5. The method of claim 1 wherein said logic circuitry determines that said link is idle in order to effect said opportunistically transmitting.

6. The method of claim 1 further comprising constructing a packet within said logic circuitry containing said software state information that includes at least one of the following:
the identity of said software code;
the identity of said processor;
the identity of said node;
an indication that said packet contains software state information;
a time or event that triggered said determining;
a sequence number, where, said sequence number identifies the order in which said packet was sent against other sent packets containing software state information of said software code.

7. The method of claim 4:
further comprising constructing a packet with said logic circuitry containing said software state information that includes at least one of the following:
the identity of said software code;
the identity of said processor;
the identity of said node;
an indication that said racket contains software state information;
a time or event that triggered said determining;
a sequence number, where, said sequence number identifies the order in which said packet was sent against other sent rackets containing software state information of said software code.

8. An apparatus comprising:
a first register to store software state information;
a second register to store information that identifies a processor having ownership of said first register;
first logic circuitry to refuse the writing of information into said second register if said information in said second register indicates that any processor has ownership of said first register
second logic circuitry to initiate the opportunistic transmission on a link of a packet containing at least a portion of said software state information
wherein said packet further comprises at least one of the following:
the identity of the program code whose state said software state information describes;
the identity of said processor having ownership of said first register;
the identity of a node within a link based computing system that includes said processor;
an indication that said racket contains software state information;
a time or event that triggered a determination that said software state information needs to be reported;
a sequence number, where, said sequence number identifies the order in which said packet was sent against other sent rackets containing software state information of said software code.

9. The apparatus of claim 8 wherein said first and second registers, said first and second logic circuitry, and more than one processor including said processor are all implemented on a semiconductor chip.

10. The apparatus of claim 9 said first register includes first register space for a first flit and second register space for a second flit.

* * * * *

UNITED STATES PATENT AND TRADEMARK OFFICE
CERTIFICATE OF CORRECTION

PATENT NO.         : 7,730,246 B2
APPLICATION NO.  : 11/173995
DATED                  : June 1, 2010
INVENTOR(S)         : Murty et al.

It is certified that error appears in the above-identified patent and that said Letters Patent is hereby corrected as shown below:

In column 7, at line 11 delete, "rackets" and insert --packets--.

In column 8, at line 2 delete, "racket" and insert --packet--.

In column 8, at line 7 delete, "rackets" and insert --packets--.

In column 8, at line 28 delete, "racket" and insert --packet--.

In column 8, at line 34 delete, "rackets" and insert --packets--.

Signed and Sealed this

Thirtieth Day of November, 2010

David J. Kappos
*Director of the United States Patent and Trademark Office*